US007567975B2

(12) United States Patent
Yalamanchi

(10) Patent No.: US 7,567,975 B2
(45) Date of Patent: Jul. 28, 2009

(54) INCREMENTAL EVALUATION OF COMPLEX EVENT-CONDITION-ACTION RULES IN A DATABASE SYSTEM

(75) Inventor: Aravind Yalamanchi, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 596 days.

(21) Appl. No.: 11/083,159

(22) Filed: Mar. 16, 2005

(65) Prior Publication Data

US 2006/0224542 A1 Oct. 5, 2006

(51) Int. Cl.
*G06F 7/00* (2006.01)
(52) U.S. Cl. .................................. 707/102; 707/100
(58) Field of Classification Search ........................ None
See application file for complete search history.

(56) References Cited

U.S. PATENT DOCUMENTS

| 5,446,885 | A | * | 8/1995 | Moore et al. ............ 707/103 R |
| 5,564,047 | A | | 10/1996 | Bloem et al. |
| 5,680,602 | A | | 10/1997 | Bloem et al. |
| 5,832,482 | A | | 11/1998 | Yu et al. |
| 5,852,818 | A | | 12/1998 | Guay et al. |
| 5,870,747 | A | * | 2/1999 | Sundaresan ................. 707/101 |
| 5,970,244 | A | | 10/1999 | Nagahashi et al. |
| 5,984,786 | A | * | 11/1999 | Ehrman ........................ 463/42 |
| 5,995,980 | A | | 11/1999 | Olson et al. |
| 5,999,931 | A | | 12/1999 | Breitbart et al. |
| 6,023,571 | A | * | 2/2000 | Matsumoto et al. ............ 703/2 |
| 6,073,129 | A | | 6/2000 | Levine et al. |
| 6,185,555 | B1 | * | 2/2001 | Sprenger et al. ............... 707/3 |
| 6,192,378 | B1 | | 2/2001 | Abrams et al. |
| 6,233,537 | B1 | * | 5/2001 | Gryphon et al. ................ 703/1 |
| 6,247,017 | B1 | | 6/2001 | Martin |

(Continued)

FOREIGN PATENT DOCUMENTS

EP    0 743 596 A2    11/1996

(Continued)

OTHER PUBLICATIONS

Paton, Norman W. et al., "Active database systems", ACM Computing Surveys (CSUR), vol. 31, No. 1, Mar. 1999, XP-002354519, 42 pages.

(Continued)

*Primary Examiner*—Hung Q Pham
*Assistant Examiner*—Hubert Cheung
(74) *Attorney, Agent, or Firm*—Hichman Palermo Truong & Becker LLP

(57) ABSTRACT

In the scenario in which a rule set is defined for composite events, instances of the associated primitive events are added to a database-centric rules engine one at a time. Rules that rely on these events fire the corresponding actions when instances of all the corresponding primitive events are detected. Intermediate states of the rule evaluations are persistently stored in the database, thereby avoiding repeated evaluation of portions of rules and supporting efficient incremental evaluation of the rules. The rules defined within a rule set could vary significantly, using various rule condition language constructs such as "any" and negation constructs. The state information generated from evaluating the rules belonging to a single rule set is all stored in a single relational table and managed using direct SQL and DML commands.

32 Claims, 7 Drawing Sheets

U.S. PATENT DOCUMENTS

| | | | |
|---|---|---|---|
| 6,304,882 B1 | 10/2001 | Strellis et al. | |
| 6,427,146 B1* | 7/2002 | Chu | 707/3 |
| 6,466,950 B1 | 10/2002 | Ono | |
| 6,490,574 B1* | 12/2002 | Bennett et al. | 706/47 |
| 6,493,701 B2* | 12/2002 | Ponnekanti | 707/2 |
| 6,539,381 B1* | 3/2003 | Prasad et al. | 707/10 |
| 6,560,592 B1 | 5/2003 | Reid et al. | |
| 6,604,093 B1* | 8/2003 | Etzion et al. | 706/47 |
| 6,604,100 B1 | 8/2003 | Fernandez et al. | |
| 6,681,383 B1 | 1/2004 | Pastor et al. | |
| 6,697,791 B2 | 2/2004 | Hellerstein et al. | |
| 6,738,975 B1 | 5/2004 | Yee et al. | |
| 6,757,710 B2 | 6/2004 | Reed | 709/203 |
| 6,801,915 B1* | 10/2004 | Mack | 707/100 |
| 6,826,579 B1 | 11/2004 | Leymann et al. | |
| 6,850,893 B2 | 2/2005 | Lipkin et al. | |
| 6,868,413 B1 | 3/2005 | Grindrod et al. | |
| 6,901,410 B2 | 5/2005 | Marron et al. | |
| 6,917,946 B2* | 7/2005 | Corl et al. | 707/102 |
| 6,925,476 B1 | 8/2005 | Multer et al. | |
| 7,003,531 B2 | 2/2006 | Holenstein et al. | |
| 7,010,525 B2 | 3/2006 | Botzer et al. | |
| 7,080,382 B2 | 7/2006 | Sexton et al. | |
| 7,089,228 B2* | 8/2006 | Arnold et al. | 707/3 |
| 7,120,635 B2 | 10/2006 | Bhide et al. | |
| 7,149,738 B2* | 12/2006 | Kumar et al. | 707/9 |
| 7,177,859 B2 | 2/2007 | Pather et al. | |
| 7,177,866 B2 | 2/2007 | Holenstein et al. | |
| 7,243,256 B2 | 7/2007 | Kaiya et al. | |
| 7,277,863 B1 | 10/2007 | Hilerio et al. | |
| 7,289,988 B2* | 10/2007 | Joseph | 707/6 |
| 7,496,591 B2 | 2/2009 | Mets et al. | |
| 2002/0062475 A1 | 5/2002 | Iborra et al. | |
| 2002/0073019 A1 | 6/2002 | Deaton | |
| 2002/0078015 A1* | 6/2002 | Ponnekanti | 707/1 |
| 2002/0091685 A1 | 7/2002 | Feldman et al. | |
| 2002/0116457 A1 | 8/2002 | Eshleman et al. | |
| 2002/0133507 A1 | 9/2002 | Holenstein et al. | |
| 2002/0138582 A1 | 9/2002 | Chandra et al. | |
| 2002/0165842 A1 | 11/2002 | Hellerstein et al. | |
| 2003/0046421 A1 | 3/2003 | Horvitz et al. | |
| 2003/0120461 A1 | 6/2003 | Mets et al. | |
| 2003/0120642 A1 | 6/2003 | Egilsson et al. | |
| 2003/0135523 A1 | 7/2003 | Brodersen et al. | |
| 2003/0204491 A1 | 10/2003 | Botzer et al. | |
| 2004/0002972 A1 | 1/2004 | Pather et al. | |
| 2004/0002988 A1 | 1/2004 | Seshadri et al. | |
| 2004/0117407 A1* | 6/2004 | Kumar et al. | 707/200 |
| 2004/0133591 A1 | 7/2004 | Holenstein et al. | |
| 2004/0181543 A1 | 9/2004 | Wu et al. | |
| 2004/0193575 A1 | 9/2004 | Chen et al. | |
| 2005/0010545 A1* | 1/2005 | Joseph | 707/1 |
| 2005/0021567 A1 | 1/2005 | Holenstein et al. | |
| 2005/0096966 A1 | 5/2005 | Adi et al. | |
| 2005/0125371 A1* | 6/2005 | Bhide et al. | 707/1 |
| 2005/0193024 A1 | 9/2005 | Beyer et al. | |
| 2005/0203940 A1 | 9/2005 | Farrar et al. | |
| 2005/0222978 A1 | 10/2005 | Drory et al. | |
| 2005/0222996 A1* | 10/2005 | Yalamanchi | 707/4 |
| 2007/0156656 A1 | 7/2007 | Pather et al. | |

FOREIGN PATENT DOCUMENTS

| | | |
|---|---|---|
| EP | 0743596 A2 | 11/1996 |
| JP | 10-222517 | 8/1998 |
| JP | 10-232877 | 9/1998 |
| JP | 2001-273330 | 10/2001 |
| WO | WO 03098479 A | 5/2003 |
| WO | WO 03/098479 A2 | 11/2003 |

OTHER PUBLICATIONS

Grosof, Benjamin N. et al., "SweetDeal: representing agent contracts with exceptions using XML rules, ontologies, and process descriptions", Proceedings of the 12th International Conference on World Wide Web, May 2003, XP-002354520, 10 pages.

Molina, H, et al., "Database Systems The Complete Book", Prentice Hall, ISBN: 0-13-098043-9, 2002, 36 pages.

Claims, PCT/US2005/009598, 6 pages.

European Patent Office, "Communication Pursuant to Article 94(3) EPC", PCT/US2005/009598, received Feb. 22, 2008, 9 pages.

Dong, Yue, et al., "An Intelligent Database for Engineering Applications", Artificial Intelligence in Engineering, vol. 12, Jan./Apr. 1998, 14 pages.

International Searching Authority, "Notification of Transmittal of the International Search Report and the Written Opinion of the International Searching Authority, or the Declaration," PCT/US2005/009598, dated Nov. 29, 2005, 18 pages.

Current Claims, PCT/US2005/009598, 6 pages.

Grosof, Benjamin N. et al., "SweetDeal: Representing Agent Contracts with Exceptions using XML Rules. Ontologies, and Process Descriptions," XP002354519, pp. 340-348.

Paton, Norman W. et al., "Active Database Systems," ACM Computing Surveys, vol. 31, No. 1, Mar. 1999, XP002354519, pp. 63-103.

Greco, Gianluigi et al., "Event Choice Datalog: A Logic Programming Language For Reasoning In Multiple Dimensions," 2004, ACM Press, pp. 238-249.

International Preliminary Examining Authority, "Notification of Transmittal of the International Preliminary Examination Report," PCT/US2005/009598, dated Jul. 10, 2006, 6 pages.

Amended Claims, PCT/US2005/009598, 6 pages (attached).

Bea, :Using Expressions and Conditions, WebLogic Process Integrator Release 1.1, 2000, located on the internet at <http://e-docs.bea.com/wlpi/wlpil l/studio/ch6.htm>, retrieved on Dec. 29, 2005, 12 pages.

Chamberlain, Don, "Query Languages and XML," Powerpoint Presentation, IBM Almaden Research Center, Dec. 2000, located on the internet at <http://www-db.sc.wisc.edu/dbseminar/fall00/talks/chamberlain>, 26 pages.

Chamberlain, Don et al., "XQuery: A Query Language for XML," W3C Working Draft, Feb. 15, 2001, located on the internet at <http://www.w3.org/TR/2001/WD-xquery-20010215/>, retrieved on Dec. 29, 2005, 83 pages.

Clark, James et al., "XML Path Language (XPath), Version 1.0," W3C, 1999, located on the internet at <http://www.w3.org/TR/xpath.html>, retrieved on Dec. 29, 2005, 37 pages.

Krishnaprasad, Muralidhar et al., "Query Rewrite in Oracle XML DB," Proceeding of the 30th VLDB Conference, 2004, pp. 1134-1145.

Unknown Author, unknown title, located on the internet at <www.cs.uku.fi/kilpelai/RDK01/lectures/Xquery.pdf>, 2001, 10 pages.

* cited by examiner

| rlm$deltime | bank | transport | fldReport |
|---|---|---|---|
| 01-JAN-05.... | BankTransaction(123, 'Transfer',..) | NULL | NULL |
| 04-JAN-05.... | NULL | Transportation(123, 'NY',..) | NULL |
| : | : | : | : |

HSRSPrimEventsTable

| rlm$rulerowid | rule_status | ... | bank_ref | transport_ref | fldReport_ref |
|---|---|---|---|---|---|
| RULE_ROWID1 | 2 | .. | ROWID1 | ROWID2 | NULL |
| RULE_ROWID1 | 1 | .. | NULL | ROWID3 | NULL |
| : | : | .. | : | : | : |

HSRSIncrementalResultsTable

*FIG. 5*

INCREMENTAL EVALUATION OF COMPLEX EVENT-CONDITION-ACTION RULES IN A DATABASE SYSTEM

CROSS REFERENCE TO RELATED APPLICATIONS

This application is related to U.S. patent application Ser. No. 10/815,220 entitled "Managing Event-Condition-Action Rules In A Database System," filed on Mar. 30, 2004; and is related to U.S. patent application Ser. No. 10/254,383 entitled "Managing Expressions In A Database System," filed on Sep. 24, 2002 and published as US-2003-0212670-A1; and is related to U.S. patent application Ser. No. 10/365,771 entitled "Managing XPATH Expressions In A Database System," filed on Feb. 12, 2003; and is related to U.S. patent application Ser. No. 10/418,882 entitled "Extensible Rules Engine In A Database Management System," filed on Apr. 17, 2003 and published as US-2003-0212657-A; the contents of all of which are incorporated by this reference in their entirety for all purposes as if fully disclosed herein.

FIELD OF THE INVENTION

The present invention relates generally to database systems and, more specifically, to techniques for incremental evaluation of complex event-condition-action rules in database systems.

BACKGROUND

Rules are typically used in business applications to guide or influence the business behavior in real-time. A majority of these applications need event-centric rules to monitor the creation of new business objects or some state changes in the business processes. An example of an event-centric rule, in the context of the travel business, is as follows: if a party reserves an airline ticket to Orlando and reserves a luxury car, offer a promotional discount to a particular Orlando hotel. Hence, upon the occurrence of the two events, the application would automatically offer the promotion to the party.

In the context of rules engines, rules are broadly divided into two classes: (1) deductive or inference rules; and (2) reactive or Event-Condition-Action (ECA) rules. The deductive rules use forward and backward reasoning to infer or deduce facts from existing knowledge bases. The ECA rules are well suited for event-centric problems, which deal with a state change and how to manage it.

Existing commercial rules engines act as repositories for business rules and facilitate the separation of the business logic from the application logic. Rules engines define some rule languages to allow declarative specification of rules and some interfaces to allow applications to interact with the rules engine. These rules engines are not suitable for multi-process event centric rule-based applications as there is no sharing between multiple rule engines running in individual application processes. The limited form of incremental rule evaluation in these engines is within the application process and this cannot be reused at a large scale.

In the publication entitled "Rule Activation Techniques in Active Database Systems" by Arie Segev, et al., only a small subset of the rule applications are considered, and a solution is proposed that uses relational tables to capture the results from incremental evaluation of rules. However this model uses one such table for each rule instead of grouping the rules in an application. Also, the types of rules supported by the approach described in the publication are limited to those testing for existence of conjunctive composite event types.

Based on the foregoing, there is room for improvement in the area of incremental evaluation of ECA rules in a database system.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5 illustrates a simplified example of an incremental results table, according to an embodiment of the invention;

DETAILED DESCRIPTION OF EMBODIMENTS OF THE INVENTION

Figure 1:
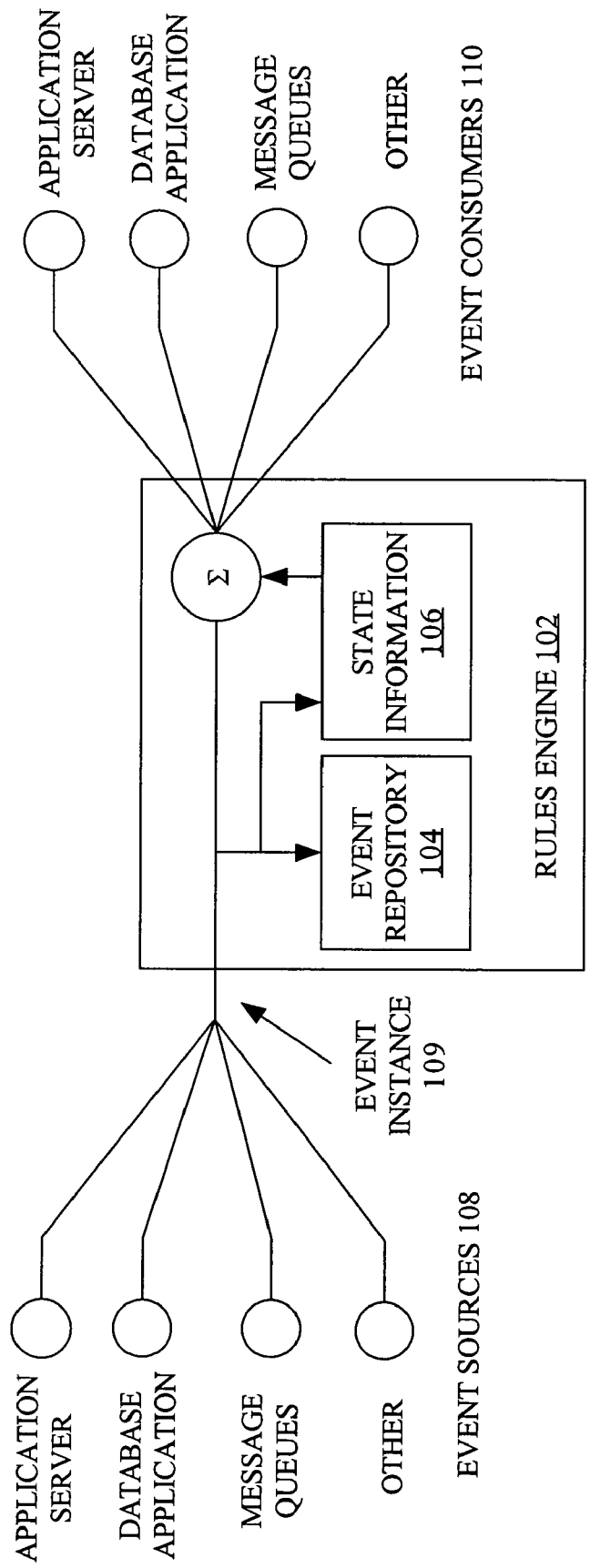
FIG. 1 is a block diagram that generally illustrates a rules engine with support for composite events, according to an embodiment of the invention.

Techniques are described for incremental evaluation of Event-Condition-Action rules in a database system. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview of Embodiments of the Invention

An event structure describes, on an abstract level, the essential factors that unambiguously identify the occurrence of an event of that type. A composite event can be defined in a database as a combination of multiple primitive events. Instances of primitive events that constitute an instance of a composite event may be generated in an application at different points in time, or in different applications.

Techniques are described for evaluating an ECA rule that is based on a composite event that is defined to consist of multiple primitive events. In response to satisfaction of a first part of a condition of the rule by an instance of a first primitive event, first state information is stored persistently in a database table. The first state information is stored in association with the first part of the condition and with the rule. The first state information represents that the first part of the condition is satisfied by the instance of the first primitive event. The first state information is stored in a first table and includes a reference to a record of the instance of the first primitive event, where the record of the first primitive event is stored in a second table. The intermediate states of rule evaluations for the rules belonging to a single rule set are all stored in a single relational table and managed using direct SQL and DML commands. Hence, repeated evaluation of portions of rules is avoided.

The rules within a rule set could be homogenous, with all the rules using all the primitive events specified within a composite event and relating them in a similar way. By contrast, the rules defined within a rule set could vary significantly, using various rule condition language constructs such as AND, ANY, NEGATION and SET. Thus, techniques are described for handling these more complex constructs.

Composite Events

As described in U.S. patent application Ser. No. 10/815,220, an event structure describes, on an abstract level, the essential factors that unambiguously identify the occurrence of an event of that type.

A composite event can be defined in the database as a combination of multiple primitive events. Primitive events that constitute a composite event may be generated in an application at different points in time, or in different applications. As an example, a "Bank Transaction" primitive event and a "Transportation" primitive event structure may be defined as follows.

```
TYPE BankTransaction AS OBJECT (
    subjectId    NUMBER,      transType    VARCHAR(30),
    amount       NUMBER,      fundFrom     VARCHAR(30));
TYPE Transportation AS OBJECT (
    subjectId    NUMBER,      vesselType   VARCHAR(30),
    locFrom      VARCHAR(30), locTo        VARCHAR(30)
    startDate    DATE,        endDate      DATE);
TYPE FieldReport AS OBJECT (
    subjectId NUMBER,         filedBy   VARCHAR(30),
    rptBody   XMLType);
``` where an instance of a BankTransaction primitive event consists of identification of the subject of a bank transaction (subjectId), the amount (amount) and type (transType) of transaction, and where the transaction funds are from (fundFrom); an instance of a Transportation primitive event consists of identification of the subject of travel (subjectId), the type of vessel used for the travel (vesselType), the points of origin (locFrom) and destination (locTo) associated with the travel, and the start (startDate) and end dates (endDate) of the scheduled travel; and an instance of a FieldReport primitive event consists of identification of the subject of the report (subjected), who filed the report (filedBy), and the body of the report (rptBody).

An event is an instantiation of the event structure, such as the following events of the BankTransaction primitive event type:

BankTransaction (1234, 'Deposit', 10000, Null);
BankTransaction (2345, 'Transfer', 32000, 'France'); and
BankTransaction (3456, 'Transfer', 50000, 'USA').

The rules defined for primitive events and composite events have similar operational characteristics in the database. In one embodiment, a composite event structure is represented as an object type with embedded types. Each embedded type in a composite event represents a primitive event. Each primitive event that is associated with a composite event can occur in a process independent of another process in which another associated primitive event occurs. As an example, a "HomelandSecurity" composite event structure may be defined as follows.

```
TYPE HomelandSecurity AS OBJECT (
    bank              BankTransaction,
    transport         Transportation,
    fldReport         FieldReport).
```

An example of a rule based on the foregoing composite event may be defined, using XML tags, as follows. This rule directs to add a person to the FBI watch list if the person receives a money transfer for more than $10,000 and rents a truck, one-way, to one of a set of defined restricted areas.

```
ON      BankTransaction (subjectId, transType, amount, fundFrom)
        bank,
        Transportation (subjectId, vesselType, locFrom, locTo,
        startDate, endDate)
                Transport
IF
        <condition>
            <and join= "bank.subjectId = transport.subjectId">
                <object name= "bank">
                    tranType = 'Transfer' AND amount >
                    10000 AND
                        fundFrom != 'USA'
                </object>
                <object name= "transport">
                    vesselType = 'Truck' AND locFrom !=
                    locTo AND
                        IsRestrictedArea(locTo) = 1
                </object>
            </and>
        </condition>
THEN
        PerformAction ('ADD2WATCHLIST', 'FBI', bank.subjectId).
```

Rules Engine Supporting Incremental Evaluation of Rules

Event consumers can use the database-centric rules engine to express their interest in composite events, such as by using SQL-WHERE clause conditional expressions with XML tags, as with the foregoing example rule. Each rule in the system acts as a state machine and a rule's action is executed when the rule reaches an accepting state. For each primitive event, the rules in the application are evaluated and the intermediate state information, along with the event information, is stored persistently in the database.

FIG. 1 is a block diagram that generally illustrates a rules engine with support for composite events, according to an embodiment of the invention.

Any number of event sources 108 can provide event instances 109 into a database-centric rules engine 102. For non-limiting examples, event instances 109 (e.g., scalar and/or XML forms) may be injected into rules engine 102 by an application server, a database application, message queues, and the like. Similarly, any number of event consumers 110 can be configured to receive, or consume, events processed by rules engine 102. For non-limiting examples, events may be consumed by an application server, a database application, message queues, and the like. Event consumers 110 define one or more rules for evaluation, by rules engine 102, against events injected into rules engine 102 by event sources 108.

As described, rules in a rule set are based on an event structure. Rules in a rule set typically map to event-condition-action rules, whereby the rules include a condition that is expressed using the attributes defined in a corresponding event structure. Rules are evaluated for an instance of the corresponding event structure and, when event instances satisfy the corresponding conditions, an action is responsively triggered.

In support of the processing of rules based on composite events, in one embodiment rules engine 102 comprises an event repository 104 and state information 106. The event repository 104 is for storing unexpired event instances. In one embodiment, event repository 104 is implemented in the form of a "primitive events" table, as described herein. The state information 106 represents the state of each rule in the rule set, at any given time, and enables incremental evaluation of rules based on composite events in a manner described herein. In one embodiment, state information 106 is implemented in the form of an "incremental results" table, as described herein.

Database Architecture Supporting Incremental Evaluation of Rules

In one embodiment, a database-centric rules engine that supports incremental evaluation of rules (e.g., rules with conditions based on composite events), such as rules engine 102 (FIG. 1), is embodied in part using a set of database objects as described hereafter. The following description and figures represent one way in which embodiments may be implemented. However, embodiments of the invention are not limited to use solely in the context of the database table architecture that follows. Thus, the structure of the database tables used for incremental evaluation of ECA rules in a database-centric rules engine may vary from implementation to implementation.

Event Structure

As mentioned, an event structure captures the vocabulary for the rules in a given rule set. Event structure is designed as an object type in the database. A composite event structure has two or more embedded object types that each represents a primitive event structure. With this model, the rules defined for the event structure can be evaluated using the instances of the corresponding type. A composite event structure can be created with special attributes that represent aliases to relational tables in the database schema. In this scenario, the events for which the rules are evaluated are the rows stored in the corresponding table(s).

Rule Set Table

A "Rule set" table is a relational table that acts as the repository for the rules. New rules can be added to the rule set with simple INSERT commands into the rule set table. A rule set table is implicitly created with a few columns to store the rule identifier (e.g., user-specified), the rule condition (e.g., in text format), and a plain text description of the rule. In addition to these columns, the rule set table can be configured to store any data (e.g., of simple types, such as NUMBER, DATE, etc.; or complex types, such as CLOB, XML, etc.) along with each rule, by creating additional columns in the rule set table.

For an example, a composite event in a Homeland Security application can be modeled to capture three types of primitive events: BankTransaction, Transportation, and FieldReport. These primitive events can be captured using RDBMS support for object (abstract) types, and the composite event structure itself can be captured as an object type with embedded primitive event types. Hence, a rule set table is created with a condition column that is associated with this composite event structure.

Figure 2:
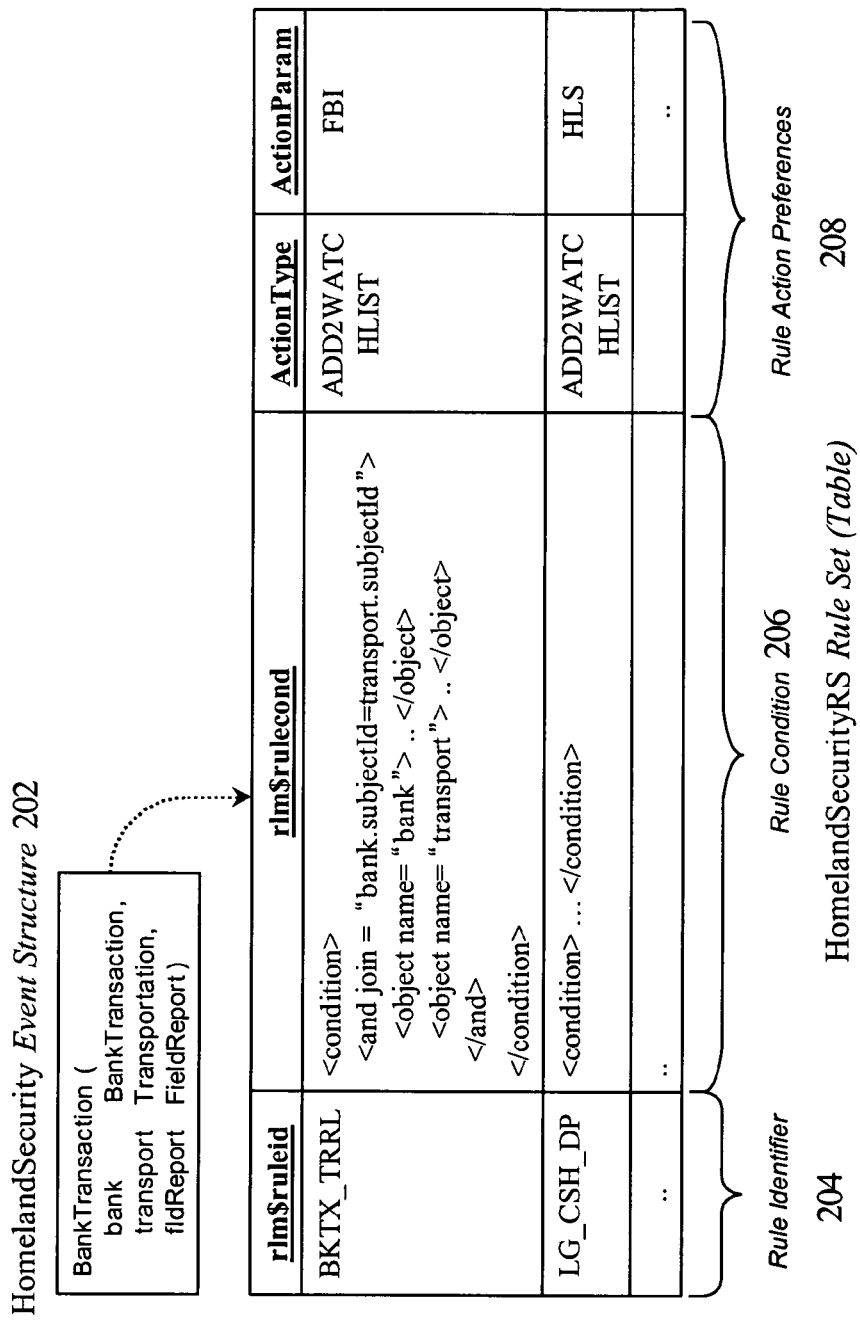
FIG. 2 illustrates a simplified example of a rule set table, according to an embodiment of the invention.

FIG. 2 illustrates a simplified example of a rule set table, according to an embodiment of the invention. The table 200 is entitled "HomelandSecurityRS", and is based on an event structure similar to the HomelandSecurity event structure 202, which is described in a foregoing example herein.

Rule set table 200 contains a "Rule Identifier" column 204 for storing a rule identifier associated with each of the rules in the HomelandSecurityRS rule set. Table 200 contains a "Rule Condition" column 206 for storing the one or more conditions from each rule in the rule set. In this illustration, the conditions are in XML format and the condition for the "BKTX-_TRRL" rule includes an equality join associated with the "bank" primitive event structure and the "transport" primitive event structure, based on one embodiment of the invention. Table 200 contains one or more "Rule Action Preference" columns 208 for storing additional information that determines the appropriate action for each rule in the rule set. The action preference columns may vary from one rule application to another. In this illustration, the HomelandSecurityRS rule set is created with two action preference columns to store the action type and an action parameter associated with the respective rules.

Primitive Conditions Table

A "Primitive Conditions" table is used to store the rule definitions in parsed format, to allow individual pieces of the rule to be evaluated separately. In this example, the primitive conditions table is a relational table with a few Expression data type columns to store the rule conditions on primitive events, and a few additional columns to store control information.

Figure 3:
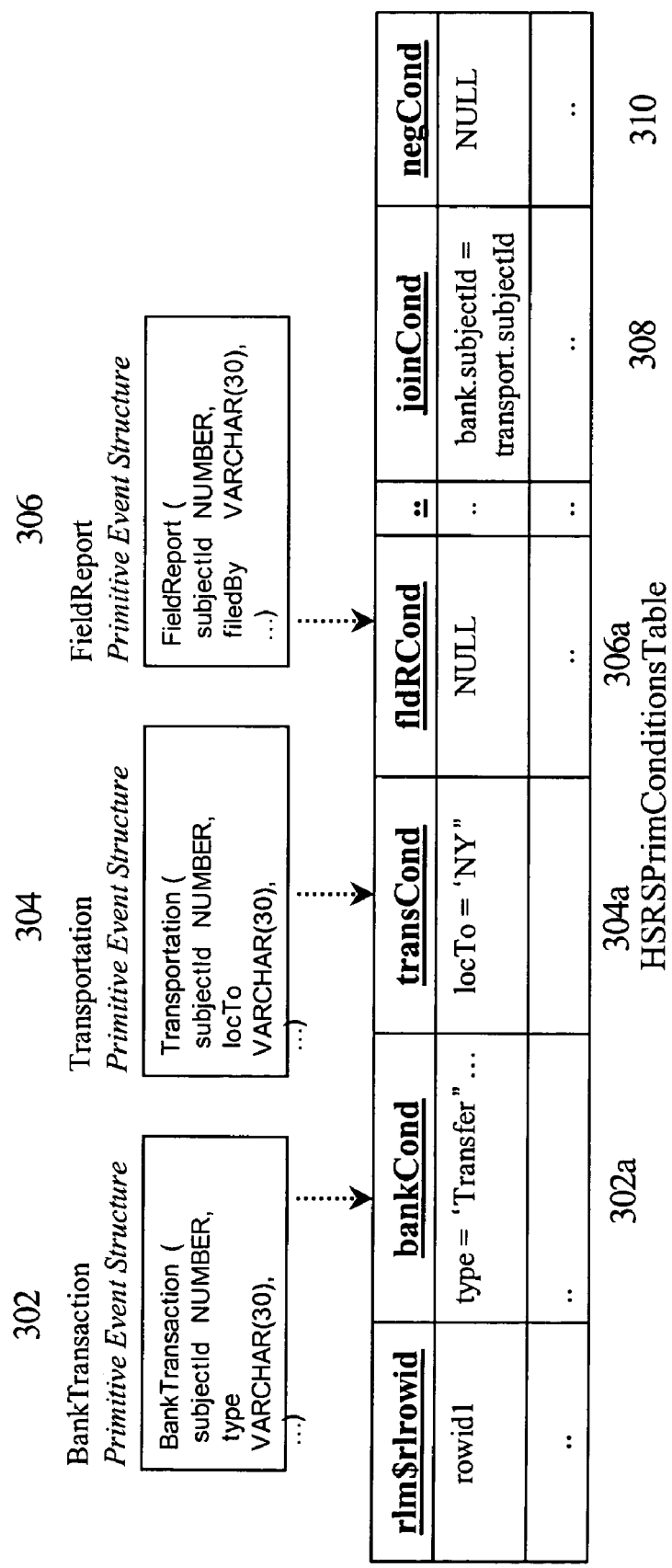
FIG. 3 illustrates a simplified example of a primitive conditions table, according to an embodiment of the invention.

FIG. 3 illustrates a simplified example of a primitive conditions table, according to an embodiment of the invention. The table 300 is entitled "HSRSPrimConditionsTable", and is based on the BankTransaction 302, Transportation 304, and FieldReport 306 primitive event structures (BankTransacation, Transportion, and FieldReport event structures are described in a foregoing example herein).

The structure of the primitive conditions table is dependent on the event structure on which the associated rule set is based. For each primitive event within a composite event, the primitive conditions table is created with a column (e.g., an Expression type column) that is associated with the corresponding primitive event type. For example, the BankTransaction 302 primitive event corresponds to column 302a, the Transportation 304 primitive event corresponds to column 304a, and the FieldReport 306 primitive event corresponds to column 306a. In one embodiment, if a composite event has more than one primitive event of the same type (such as an event modeled to capture two bank transactions), the primitive conditions table has multiple columns associated with the same primitive event type, one column per primitive event.

In addition to the primitive event columns, in one embodiment the primitive conditions table has two columns (e.g., Expression type columns) to store (1) the join conditions extracted from the rule conditions, column 308, and (2) the join condition specified with a negation construct, if any, column 310. Additional columns may be used to store rule control information or metadata, such as (1) the minimum number of primitive events required for the rule to evaluate to true, and (2) the bit representation of the primitive events participating in a negation portion of a rule, as described hereafter.

Each row in the primitive conditions table represents a rule in the corresponding rule set. Some of the columns may be empty for a row based on the exact rule condition specified for the rule. For example, if a rule condition does not use a negation construct, the negative join condition column stores NULL for that particular row.

Primitive Events Table

A "Primitive Events" table acts as an event repository for storing all the unexpired event instances. Primitive events table is used as the event repository 104 of FIG. 1. Generally, the primitive events table can be queried to get information about past events.

The number of unique primitive event types participating in a composite event structure determines the structure of the corresponding primitive events table. Particularly, in one embodiment, there is one embedded object type column in a primitive events table for every primitive event type in the composite event structure. These columns are used to store the corresponding event instances.

Figure 4:
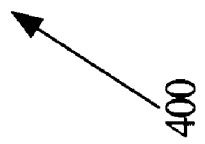
FIG. 4 illustrates a simplified example of a primitive events table, according to an embodiment of the invention.

FIG. 4 illustrates a simplified example of a primitive events table, according to an embodiment of the invention. The table 400 is entitled "HSRSPrimEventsTable". Table 400 contains "bank" column 402, which corresponds with primitive event instances in accordance with the BankTransaction primitive event structure (e.g., 302 of FIG. 3). Table 400 contains "transport" column 404, which corresponds with primitive event instances in accordance with the Transportation primitive event structure (e.g., 304 of FIG. 3). Table 400 contains "fldReport" column 406, which corresponds with primitive event instances in accordance with the FieldReport primitive event structure (e.g., 306 of FIG. 3).

As described in U.S. patent application Ser. No. 10/815, 220, one of the event management policies enforced by a rules manager, such as rules engine 102 (FIG. 1), is the duration of the events. The event duration could be, for example, a calculated time from the time of event creation, or it could be associated with database sessions and transactions. To support duration policies, in one embodiment, the primitive events table is created with a timestamp column that stores the time of deletion for each event instance. As depicted in FIG. 4, table 400 contains timestamp column 408 for storing values that represent the time of deletion for each event instance.

When an event instance is associated with a calculated duration time (e.g., n minutes, n hours or n days), the deletion time is computed based on the event creation time and this value is stored in timestamp column 408. Alternatively, when the duration policy is based on the database transaction or session, the timestamp column is left empty and the table is configured to empty itself immediately after each transaction or session, respectively.

The timestamp column 408 is also used to enforce event consumption policies. That is, the act of consuming an event is recorded in the timestamp column 408 by setting the delete time, for an event, in the past. Any event with a delete time in the past is considered deleted. Therefore, a background process can clean out such events at a later time, i.e., the background process can release resources associated with such events. The delayed clean out for the expired events ensures that foreground processes are not delayed for a computationally expensive clean out operation. Furthermore, the background process can clean out the deleted events and the corresponding incremental results, in batches.

Incremental Results Table

An "Incremental Results" table stores the state information for each rule in the rule set, at any point in time. The information in this relational table is updated as new arriving events match portions of the rules.

A unique characteristic of the rules engine 102 (FIG. 1) in a RDBMS is that the incremental results from evaluating the rules for a partial set of events (i.e., state information for the rules in intermediate states) are preserved persistently in the database. These results are stored in an incremental results table that is structured to store the incremental results for all the rules in a given rule set. This table is created with placeholders for each type of primitive event, and used to track any partially composed composite events that could potentially satisfy a rule condition. Each row in this table represents a state for a particular rule based on a particular combination of primitive events that form a composite event. As more primitive events become available, the rule could reach an accepting state, thereby triggering execution of a corresponding action.

FIG. 5 illustrates a simplified example of an incremental results table, according to an embodiment of the invention. The table 500 is entitled "HSRSIncrementalResultsTable". In one embodiment, the incremental results table is created, at a minimum, with a rule identifier column and one ROWID column for each primitive event within a composite event structure.

Table 500 contains rule row identifier column 502 to store an identifier of the corresponding rule. Rule row identifier column 502 may store values from the rule identifier column of a corresponding rule set table, such as rule identifier column 204 of table 200 (FIG. 2), or may store corresponding row_ids for each rule in the rule set. Table 500 contains primitive event reference columns 504, 506, 508 for storing the references to the respective primitive events that are stored in a corresponding primitive events table, such as primitive events table 400 of FIG. 4. A reference in a given column is to the primitive event that satisfies the partial condition, from the rule corresponding to the row, associated with the column. Columns 504, 506, 508 of table 500 are depicted storing ROWID values that identify the respective corresponding row identifiers from a corresponding primitive events table (ROWID values not shown in table 400).

In addition to the foregoing columns, a rule status column 510 stores some encoded information with respect to the type of the rule and the current state of the rule. For example, rule status column 510 may store the number of primitive conditions that have been satisfied by instances of primitive events, for the corresponding rule. In the case of rules involving a negation construct, the encoding includes a bit representation of the negative events that have already occurred, the importance of which is described hereafter.

Action Callback Procedure

A procedure, referred to as the action callback procedure, implements a common action for all the rules in a given rule set. The signature of the callback procedure is determined based on the list of primitive event structures configured for the rule set as well as the structure of the rule set table. The action callback procedure for a rule set implements the entry point for various actions suggested by the rules belonging to a rule set. For any rule matching a set of primitive events that form a composite event, the complex event information, the rule definition, along with any auxiliary data stored with the rule condition, is passed into the action callback procedure. Hence the appropriate action for a rule can be determined using all this information.

Rule Set Execution Package

A rule set execution package ties together all the foregoing database objects. In one embodiment, this package is programmed to (a) receive an instance of a primitive event; (b) record the event instance in the event repository 102 (FIG. 1), such as a primitive events table (e.g., table 400 of FIG. 4); (c) identify the portions of the rule conditions that are satisfied based on the event instance; (d) record the portions of the rule conditions that are satisfied in an incremental results table (e.g., table 500 of FIG. 5); (e) identify the rules, if any, that reached an accepting state in response to the event instance; and (f) perform, or cause performance of, the action suggested by the rule by invoking the action callback procedure.

The runtime behavior of a rule set is determined by the rule set execution package that is automatically generated at the time of rule set creation. This package takes the rule set configuration with respect to the event structures, conflict resolution criteria, event consumption, etc., into account. This package is broken into procedures to perform various operations on the rule set, as described herein. Some of the user-initiated operations are internally mapped to these procedures. The package is primarily used for processing the primitive events.

Although the same set of database objects can be used for any rule-based application managed in the database, the structure of some of these objects varies based on the event structure configuration. Further, the type of data stored in the primitive conditions table and the incremental results table varies based on the type of the rule (AND, ANY, NEGATION, etc.) a row is representing, as described hereafter.

Event Processing

The event processing procedures defined in the rules set execution package accept an event from an event source 108 (FIG. 1) and, in one embodiment, perform as follows.

Figure 6:
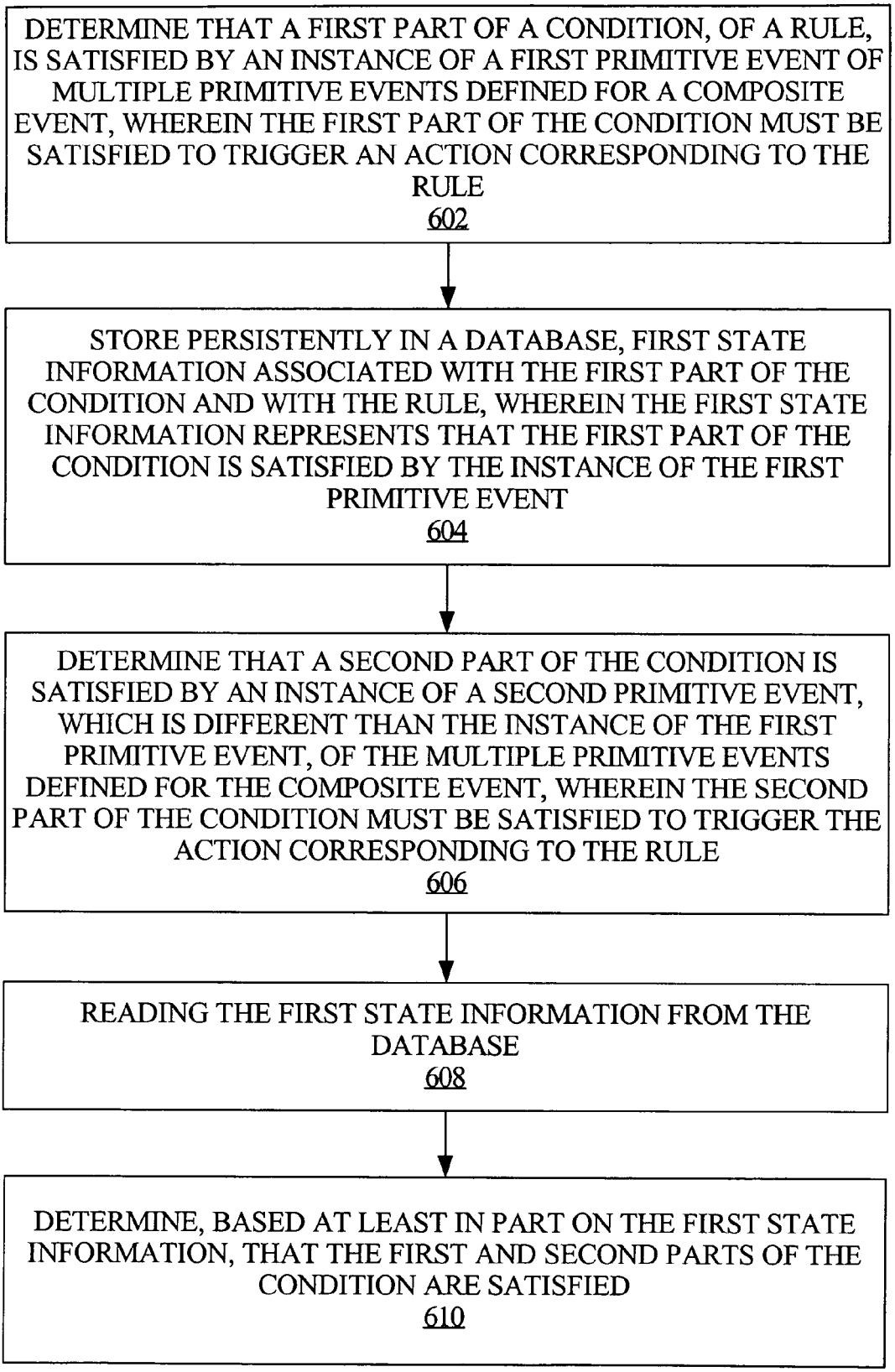
FIG. 6 is a flow diagram that illustrates a method for evaluating a rule based on a composite event that is defined to consist of multiple primitive events, according to an embodiment of the invention.

FIG. 6 is a flow diagram that illustrates a method for evaluating a rule based on a composite event that is defined to consist of multiple primitive events, according to an embodiment of the invention. FIG. 6 is performed by an electronic computing platform, such as computer system 700 of FIG. 7, by executing one or more sequences of instructions. In one embodiment, the sequences of instructions are integrated into a database server.

At block 602, determine that a first part of a condition of the rule is satisfied by an instance of a first primitive event of the multiple primitive events. The first part of the condition must be satisfied to trigger an action corresponding to the rule. In one embodiment, information about the instance of the first primitive event is stored in a primitive events table, such as primitive events table 400 of FIG. 4.

For example, the primitive rule conditions that correspond to the instance of the first primitive event are evaluated using a SQL query with an EVALUATE operator, as described U.S. patent application Ser. No. 10/815,220. In one embodiment, such a SQL query operates on a corresponding expression column in the primitive conditions table, such as any of columns 302a, 304a, 306a of primitive conditions table 300 of FIG. 3. When the composite event structure is defined with duplicate primitive event types, processing is repeated for the multiple primitive rule condition sets stored in different columns of the primitive conditions table. For example, if a composite event is modeled to capture two similar bank transactions, each bank transaction primitive condition is associated with a corresponding respective column in the primitive conditions table. Hence, in response to an instance of a bank transaction event, the evaluation processing is repeated for each of the two columns representing the duplicate primitive conditions.

At this point, the results from the query with the EVALUATE operator may be joined with an incremental results table to identify the rules that are satisfied with the current event and past events for which state information is already stored in the incremental results table. In one embodiment, this join operation is performed whenever a primitive event is determined to satisfy a part of a rule condition. This join operation is optimized for any equality join predicate specified at the rule set level, i.e., a join predicate that is common across all the rules, such as bank.SubjectId=transport.SujectId=fldReport.SubjectId, should be satisfied for the three events to be considered related.

The results from the join operation may be further processed to identify the rules for which all the required primitive conditions are satisfied by instances of primitive events, for the rules' actions to be triggered. For each of these rules, its join predicate is evaluated using the corresponding primitive event information.

Regardless of whether any rule's conditions are determined to have been completely satisfied in view of the instance of the first primitive event, processing continues as follows. At block 604, first state information is stored persistently in a database. The first state information represents that the first part of the condition is satisfied by the instance of the first primitive event, and is stored in association with the first part of the condition and in association with the rule. In one embodiment, the state information is stored in a record in an incremental results table, such as incremental results table 500 of FIG. 5. In this embodiment, the state information includes a reference to a record in a primitive events table, such as primitive events table 400 of FIG. 4, of the instance of the first primitive event. For example, column 504 of incremental results table 500 contains a reference (e.g., ROWID1) to the record of the corresponding instance of the primitive event in the primitive events table 400 (ROWID not shown in table 400), for the instance of the primitive event that met the condition corresponding to the column 504.

Significantly, the database-centric rules engine described herein supports processing of primitive events from multiple different database sessions, and from multiple different applications. Furthermore, the database-centric rules engine is scalable and flexible, in that it supports processing of different rules within a rule set, and innumerable rule sets, in view of incoming events.

The database-centric rules engine is "always on" whenever the corresponding database is up and running. Thus, as new events arrive, processing continues as follows. At block 606, determine that a second part of the condition of the rule is satisfied by an instance of a second primitive event of the multiple primitive events, where (a) the instance of the second primitive event is different than the instance of the first primitive event, and where (b) the second part of the condition must be satisfied to trigger an action corresponding to the rule. Functionally, the rules engine is developing or monitoring the occurrence of composite events by processing instances of primitive events, and determining whether such instances satisfy any rule conditions and, perhaps, any rules completely. In one embodiment, information about the instance of the second primitive event is stored in the primitive events table in which the information about the instance of the first primitive event is stored, such as primitive events table 400 of FIG. 4.

At block 608, the first state information is read from the database, e.g., via the join operation between the incremental results table and the primitive conditions table that identified the rule that matched the second event. At block 610, it is determined, based at least in part on the first state information read from the database, that the first and second parts of the condition are satisfied. For example, as before, the primitive rule conditions that correspond to the instance of the second primitive event are evaluated using a SQL query with an EVALUATE operator, and the results from this query may be joined with the incremental results table to identify the rules that are satisfied by the collection of events for which state information is stored in the incremental results table.

For example, analysis of the first and second state information may determine that a particular rule now has all of its constituent primitive conditions satisfied, including any equality joins associated with the first and second parts of the condition (e.g., bank.SubjectId=transport.SujectId). Consequently, that particular rule's action can now be performed, inside the database, or caused to be performed outside of the database. That is, if the equality join condition for the rule is satisfied, the corresponding incremental result is recorded into an action execution list. This step is repeated for all the matching rules that have all conditions satisfied.

In one embodiment, conflict resolution criteria for the rule set are applied as an ORDER BY clause on the action execution list to sort the actions in the desired order.

In one embodiment, the rule actions are executed by invoking the action callback procedure for the rules whose conditions were determined to be completely satisfied. If an EXCLUSIVE consumption policy is used for one or more primitive events, the corresponding primitive events will be deleted (i.e., consumed) from the primitive events table. As mentioned, consumption of primitive events may be implemented by setting the time in timestamp column 408 of primitive events table 400 (FIG. 4) to a time in the past. This in turn could remove some rules from the action execution list due to the removal or consumption of the required primitive events.

There are some differences in the foregoing process for rules involving "ANY n" and Negation constructs, as described hereafter.

Incremental Evaluation of Rules

In summary, the rules defined for a composite event evaluate to true when all the required primitive events are read and any predicates joining these primitive events evaluate to true. In a real-world application, the primitive events themselves may be separated by time and/or the events may be generated in different applications and/or sessions. A brute force way of evaluating rules is to execute the complete rule as a SQL query on the history of events whenever there is a new event in the system. This approach is inefficient because parts of the rule are evaluated repeatedly with the existing events until all the required events are read. With the techniques described herein, each rule in the rule set is processed like a state machine, and as more primitive events are read, the intermediate states are preserved. When the state machine representing the current state of the rule reaches an accepting state, based on the outcome of the rule's join condition evaluation, the rule's action is added to the execution list and the action is performed.

The maintenance of the state information and the persistent representation of the rule state information depend on the type of the rule. That is, maintenance of state information depends on whether the rule is conjunctive, or contains a complex construct such as "any", "not", "not any", temporal, sequencing constructs. In one embodiment, the state information is captured as a row in the incremental results table. Minimally, the state information includes (1) the current count of the primitive events that matched a given rule, e.g., rule status column 510 of incremental results table 500 (FIG. 5), and (2) references to these primitive events, e.g., as in columns 504, 506, 508 of incremental results table 500. The count of the primitive events is used to determine the need for evaluating the join predicate for the rule. If an equality join predicate is specified at the rule set level (e.g., bank.subjectId=transport.subjectId), then in one embodiment the key value from one these events (e.g., subjectID="myname") is also preserved in the state information for each instance of a primitive event. This framework facilitates efficient composition of the composite events from individual primitive events.

In one embodiment, the rule status column 510 in the incremental results table stores the current count of the primitive events as well as an encoded bit vector for rules involving negation constructs, described hereafter.

In one embodiment, for rules involving simple conjunction of primitive events (e.g., using <and> element within <condition> element), any join predicate in the rule is evaluated only when the count of the primitive events (stored in rule status column 510) matches the number of primitive events (<object> elements) specified in the <and> element. As discussed, if the join condition is satisfied, the rule's action is added to the action execution list.

The following Rule 1 is an example of a rule structure with a conjunctive ("and") condition construct.

---
Rule 1:
---

```
<condition>
    <and join="E1.id = E2.id">
        <object name="E1" ... />
        <object name="E2" ... />
    </and>
</condition>
```

Once the rule action is performed (e.g., in response to events e11 and e21 for Rule 1), assuming that the events are configured for shared consumption policy, a new primitive event (e.g., e22) can replace one of the existing events (e.g., e21) in the state information and form a new composite event [e11, e22] that matches the rule condition. For this purpose, in one embodiment, the accepting state of the rules is also preserved in the incremental results table until the events themselves are cleaned up, for example, based on an event duration policy or consumption policy.

"Any" Construct

The following Rule 2 is an example of a rule structure with an "any" condition construct.

---
Rule 2:
---

```
<condition>
    <any count = "2" equal="E1.id, E2.id, E3.id">
        <object name="E1"/>
        <object name="E2"/>
        <object name="E3"/>
    </any>
</condition>
```

In the case of the rule conditions involving "any" constructs, the join condition is evaluated when the number of primitive events in the state information matches the value specified for the count attribute of the <any> element (equal to 2 for Rule 2). The rule action is executed if the join condition is satisfied.

In one embodiment, at this stage the rules that are in the accepting state are post-processed for future events. For this purpose, the state information that represents an accepting state (e.g., events [e11, e21, null] for Rule 2) is duplicated and broken into multiple rows in the incremental results table, each nullifying one existing primitive event reference (e.g., [e11, null, null] and [null, e21, null]). With this representation, any new event could easily match with either one of these "partial" states to form new composite events. For example, when event e31 is read, two composite events are formed, [e11, null, e31] and [null, e21, e31]. Hence, by duplicating and decomposing one rule state into multiple states, which are represented as multiple rows in the incremental results table, future evaluations can simply use SQL queries on this table.

Negation Construct

The following Rule 3 and Rule 4 are examples of rule structures with negation conditions constructs, i.e., "not" in Rule 3 and "not any" in Rule 4.

---

Rule 3:

```
<condition>
    <and equal="E1.id, E2.id, E3.id">
        <object name="E1"/>
        <object name="E2"/>
        <not join="E2.attr1 = E3.attr1">
            <object name="E3"/>
        </not>
    </and>
</condition>
```

Rule 4:

```
<condition>
    <and equal="E1.id, E2.id, E3.id, E4.id">
        <object name="E1"/>
        <object name="E2"/>
        <notany count="1" join="E2.attr1 = nvl(E3.attr1, E4.attr1)">
            <object name="E3"/>
            <object name="E4"/>
        </not>
    </and>
</condition>
```

---

The counting of the number of primitive events matching the rule condition is not straightforward in the presence of negation constructs in the rule conditions. In such a scenario, only the events not participating in the negative portion of the rule (within <not> or <notany> elements) should count towards the primitive events that could activate the rule. For faster execution of this logic, in one embodiment, a bit vector representation of the particular events participating in the negative portion of each rule is stored. For example, such a bit vector may be stored in the primitive conditions table 300 of FIG. 3. While maintaining the state information, the primitive event count stored in the rule status column 510 of incremental results table 500 of FIG. 5 is incremented only if the current primitive event's bit position is not set in the bit vector representation of the negative events.

A rule involving a negative construct reaches an accepting state when the primitive event count in the state information becomes equal to the number of primitive events (<object> elements) embedded directly in the <and> element in the rule condition (e.g., equal to 2 for Rule 3 and Rule 4 above). With such rules, complex post-processing logic is performed to determine if the rule action should be executed. Assuming the primitive event count in the state information already matched the actual number of events and the join condition specified with the <and> element is satisfied, the rule is added to the action execution if any of the following criteria are met.

Criteria 1: The only primitive event listed within the <not> element is not read (the corresponding event reference is NULL in the state information); or Criteria 2: The only primitive event listed within the <not> element is read but the join condition specified with the <not> element evaluated to false; or Criteria 3: If the number of negative primitive events read is not equal to the threshold specified with the count attribute of the <notany> element (note that the number of negative primitive events cannot be greater than the threshold if the logic of decomposing the state into multiple states, as in the case of rules involving <any> element, is enforced for <notany> element, according to one embodiment); or Criteria 4: If the number of negative primitive events read matches the threshold specified for the <notany> element, but the join condition specified for the <notany> element evaluated to false.

With rules having negation constructs, adding a rule action to the action execution list does not ensure execution of the action. While processing a primitive event, some of the actions added to the execution list will be retracted if there exists some rule state information that has the same set of positive events and different negative event(s) that do not satisfy any of the foregoing four criteria. For example, if [e11, null, e31] and [e11, null, e32] are two states (with different set of events) of Rule 3, then an event e21 could create two states such as [e11, e21, e31] and [e11, e21, e32]. If the first of these two states satisfies criteria 2 from above (i.e., the join condition E2.attr1=E3.attr1 is false), then this rule action is added to the action execution list. However, if the join condition in the <not> element evaluates to true with the second state, in addition to not adding the rule action to the execution list, the rule actions that are already in the list for the same set of positive events [e11, e21, *] are removed from the action execution list.

Negation Construct with Deadline

A variant of a rule involving negation constructs is a rule involving a deadline for the negative events. The following Rule 5 is an example of a rule condition with a negation construct with a deadline.

---

Rule 5:

```
<condition>
    <and equal="E1.id, E2.id, E3.id">
        <object name="E1"/>
        <object name="E2"/>
        <not by="systimestamp+0.001" join="E2.attr1 = E3.attr1">
            <object name="E3"/>
        </not>
    </and>
</condition>
```

---

The rule condition is considered true only if the negative events specified within the <not> or <notany> constructs are not read within a deadline specified using the by attribute of the <not> construct (e.g., systimestamp+0.001). Although much of the processing for a rule such as Rule 5 is similar to a negation rule with no deadline, the execution of actions for matched rules varies because of the deadline. Similar to the other rules, the state information of these rules is maintained in the incremental results table. However, in one embodiment, the logic involving rules with negation and a deadline is broken into multiple steps, as follows.

When the rule's state machine reaches an accepting state, i.e., when the number of primitive events matching this rule becomes equal to the number of <object> elements specified directly under <and> element, and if one of the four criteria specified for the negative rule is satisfied, then the rule is scheduled for action execution in the future. The deadline specified as a timestamp calculation assigned to the by attribute of the <not> element is computed and the rule action is scheduled to run at that time. A flag is set in the rule state information indicating that an action has been scheduled for this rule. In a background process, when the database scheduler picks up the job of executing a rule's action, it fetches the corresponding state information and then executes the rule action if it still matches one of the four negative rule criteria.

With a rule with negation and a deadline, when a new primitive event matches the negative portion of a rule (i.e., the <object> element specified within the <not> or <notany> elements) that has a scheduled action flag set in its state information (which means that the rule is already in an accepting state), the scheduled action for the rule will be deleted if the new event satisfies the join condition specified within the <not> element (or the resulting rule state information fails all the four criteria specified for the negative rule).

The most common usage of rules with negation and deadline constructs is to catch exceptions, for example, if a Purchase Order was received and the order was not shipped within 24 hours. For such rules, most common interactions with the database scheduler is to schedule the action based on the deadline computation, and later retract the action when the compensating negative event is read. Thus, only a small percentage of the scheduled actions are actually executed. For a high-level scheduler, scheduling and retracting some jobs are heavy weight operations and the system will not scale for high rate of job creations and deletions.

Therefore, in one embodiment, a lightweight scheduler is used that is optimized for frequent scheduling and retraction of events. Since the number of scheduled actions associated with a rules engine depends on the number of rule sets, and the number of rules with negation and deadline constructs within those rule sets, all the actions are pooled together and a fixed number of database scheduler processes are configured to perform the scheduled actions. This avoids the repeated initialization and termination of scheduler processes if the individual actions are scheduled as separate jobs. While pooling all the scheduled actions, the ordering among these jobs is maintained in a common dictionary table with an index on the scheduled time. One or more scheduler processes work off the lower end of the scheduled time index and execute the action whose scheduled time is less than or equal to the current time. With this model, the act of scheduling and retracting an action is as simple as inserting and deleting rows from this dictionary table.

In one embodiment, the common table is an index-only table, in which the data is kept sorted on a primary key. Index-only tables differ from a regular table, for example, in that the table rows are maintained in a B-tree index built on the primary key. The B-tree index contains both the encoded key value and the encoded key value's corresponding row contents. The row contents are stored in place of the ROWID that is stored in regular B-tree index configurations.

Hardware Overview

Figure 7:
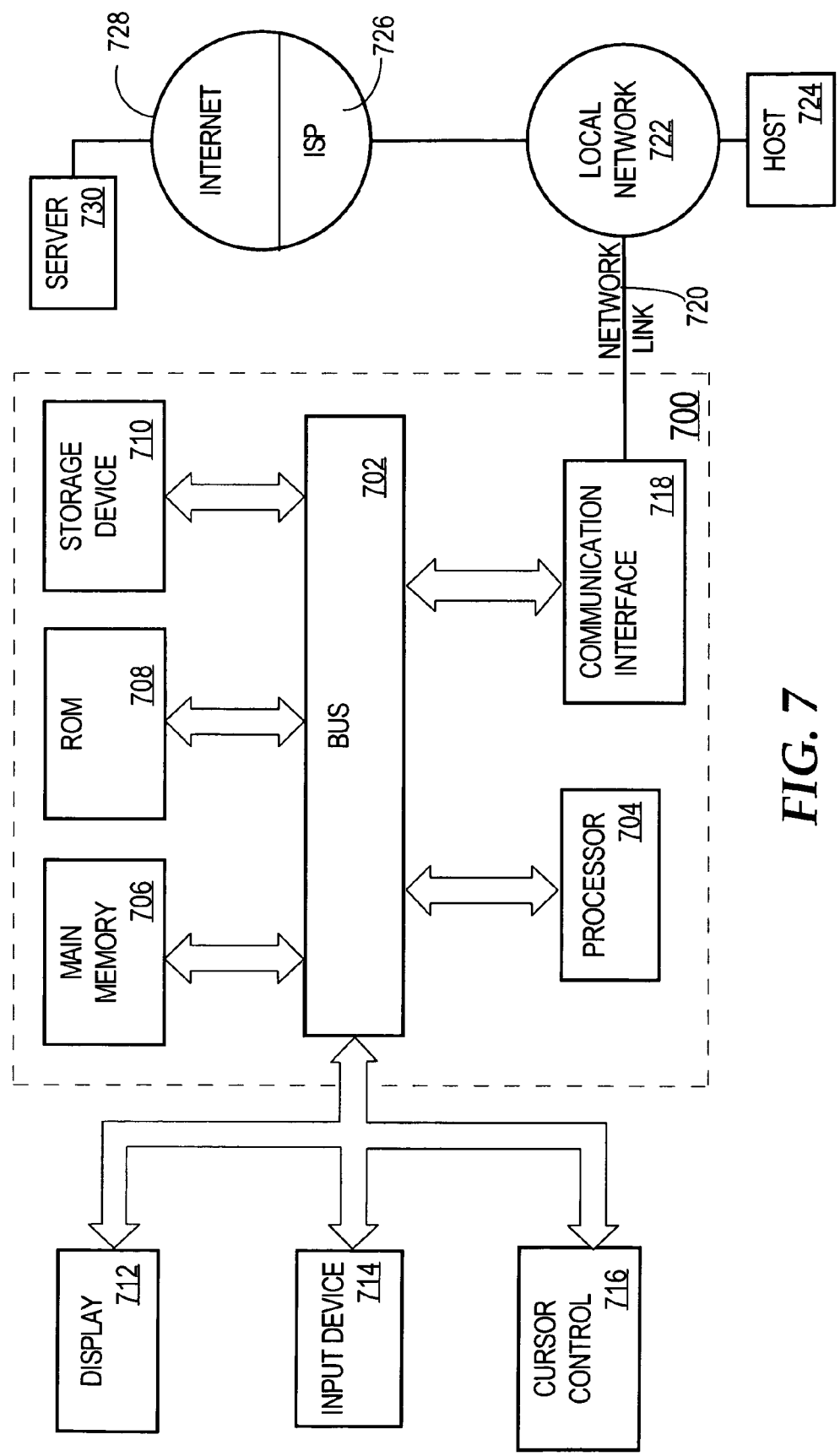
FIG. 7 is a block diagram that illustrates a computer system upon which an embodiment of the invention may be implemented.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 700, various machine-readable media are involved, for example, in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for managing evaluation of a rule based on a composite event that is defined to consist of multiple primitive events, the method comprising the steps of:

determining that a first part of a condition, of the rule, is satisfied by an instance of a first primitive event of the multiple primitive events, wherein the first part of the condition must be satisfied to trigger an action corresponding to the rule;

storing, persistently in a first table of a database and based on a first SQL operation on the first table, first state information associated with the first part of the condition and associated with the rule, wherein the first state information represents that the first part of the condition is satisfied by the instance of the first primitive event of the multiple primitive events;

wherein the first state information includes a reference to a record, in a second table, of the instance of the first primitive event of the multiple primitive events;

determining that a second part of the condition, of the rule, is satisfied by an instance of a second primitive event of the multiple primitive events, wherein the instance of the second primitive event of the multiple primitive events is different than the instance of the first primitive event of the multiple primitive events and wherein the second part of the condition must be satisfied to trigger the action corresponding to the rule;

in response to determining that the second part of the condition is satisfied, reading the first state information stored persistently in the first table of the database; and determining, based at least in part on the read first state information stored persistently in the first table of the database, that the first part of the condition and the second part of the condition are satisfied, wherein determining that the first part of the condition and the second part of the condition is satisfied includes identifying, based on a second SQL operation on a third table, the condition in the third table, and wherein reading the first state information includes identifying, based on a third SQL operation on the first table, the first state information in the first table; and wherein the steps are performed on one or more computing devices.

2. The method of claim 1, farther comprising:

determining whether a join condition associated with the first part of the condition and the second part of the condition is satisfied by the instance of the first primitive event of the multiple primitive events and the instance of the second primitive event of the multiple primitive events.

3. The method of claim 2, wherein reading the first state information includes identifying the first state information based on the join condition.

4. The method of claim 2, farther comprising:

in response to determining that the condition is satisfied, based at least in part on the join condition and the first part of the condition and the second part of the condition being satisfied, triggering performance of the action corresponding to the rule.

5. The method of claim 2, wherein the condition includes an "any" construct, the method further comprising:

storing persistently in the database, second state information associated with the second part of the condition and associated with the rule, wherein the second state information represents that the second part of the condition is satisfied by the instance of the second primitive event of the multiple primitive events;

wherein the step of storing the first state information includes storing the first state information in a first record of the first table; and wherein the step of storing the second state information includes storing the second state information in a second record of the first table.

6. The method of claim 2, further comprising determining that the condition is satisfied by determining that (a) a first value, from the first table, equals (b) a second value, from the third table for storing the parts of the condition, wherein the first value represents a number of parts of the condition that are satisfied, wherein the second value represents the number of parts of the condition that must be satisfied for the condition to be satisfied.

7. The method of claim 6, wherein the condition includes a negation construct, and wherein the second value represents the number of parts of the condition that are not associated with the negation construct.

8. The method of claim 7, further comprising:
storing in the database an identifier of particular parts of the condition that are not associated with the negation construct; and
incrementing the first value only in response to satisfaction of one of the particular parts of the condition that are not associated with the negation construct.

9. The method of claim 6, wherein the condition includes a negation construct associated with a time of expiration, the method further comprising:
in response to determining that the condition is satisfied, inserting a record into a fourth table for scheduling performance of the action corresponding to the rule.

10. The method of claim 9, further comprising:
in response to the time of expiration passing, triggering performance of the action corresponding to the rule; and
deleting the record from the fourth table.

11. The method of claim 9, further comprising:
in response to determining that a negative condition of the negation construct is satisfied by a new instance of the first primitive event or a new instance of the second primitive event, deleting the record from the fourth table to retract the scheduled performance of the action corresponding to the rule.

12. The method of claim 10, wherein the fourth table is an index-only table.

13. The method of claim 1, wherein the instance of the first primitive event of the multiple primitive events is received in a first session with the database, and wherein the instance of the second primitive event of the multiple primitive events is received in a second session with the database that is a different session than the first session.

14. The method of claim 1, wherein the instance of the first primitive event of the multiple primitive events is received from a first application, and wherein the instance of the second primitive event of the multiple primitive events is received from a second application that is a different application than the first application.

15. The method of claim 1, wherein the rule is a first rule from a group of rules in which all rules in the group of rules are based on a same composite event structure, and wherein the first rule from the group of rules is a different rule than a second rule from the group of rules.

16. The method of claim 15, farther comprising:
wherein the first primitive event of the multiple primitive events is associated with a first part of a condition, of the second rule from the group of rules, that must be satisfied to trigger an action corresponding to the second rule;
determining whether the first part of the condition, of the second rule from the group of rules, is satisfied by the instance of the first primitive event of the multiple primitive events; and
if the first part of the condition, of the second rule from the group of rules, is satisfied by the instance of the first primitive event of the multiple primitive events, then storing persistently in the database second state information associated with the first part of the condition, of the second rule from the group of rules, and associated with the second rule from the group of rules, wherein the second state information represents that the first part of the condition, of the second rule from the group of rules, is satisfied by the instance of the first primitive event of the multiple primitive events.

17. A machine-readable storage medium storing one or more sequences of instructions which, when executed by one or more processors, causes the one or more processors to perform the method recited in claim 1.

18. A machine-readable storage medium storing one or more sequences of instructions which, when executed by one or more processors, causes the one or more processors to perform the method recited in claim 2.

19. A machine-readable storage medium storing one or more sequences of instructions which, when executed by one or more processors, causes the one or more processors to perform the method recited in claim 3.

20. A machine-readable storage medium storing one or more sequences of instructions which when executed by one or more processors, causes the one or more processors to perform the method recited in claim 4.

21. A machine-readable storage medium storing one or more sequences of instructions which when executed by one or more processors, causes the one or more processors to perform the method recited in claim 5.

22. A machine-readable storage medium storing one or more sequences of instructions which when executed by one or more processors, causes the one or more processors to perform the method recited in claim 6.

23. A machine-readable storage medium storing one or more sequences of instructions which, when executed by one or more processors, causes the one or more processors to perform the method recited in claim 7.

24. A machine-readable storage medium storing one or more sequences of instructions which, when executed by one or more processors, causes the one or more processors to perform the method recited in claim 8.

25. A machine-readable storage medium storing one or more sequences of instructions which, when executed by one or more processors, causes the one or more processors to perform the method recited in claim 9.

26. A machine-readable storage medium storing one or more sequences of instructions which, when executed by one or more processors, causes the one or more processors to perform the method recited in claim 10.

27. A machine-readable storage medium storing one or more sequences of instructions which, when executed by one or more processors, causes the one or more processors to perform the method recited in claim 11.

28. A machine-readable storage medium storing one or more sequences of instructions which, when executed by one or more processors, causes the one or more processors to perform the method recited in claim 12.

29. A machine-readable storage medium storing one or more sequences of instructions which, when executed by one or more processors, causes the one or more processors to perform the method recited in claim 13.

30. A machine-readable storage medium storing one or more sequences of instructions which, when executed by one or more processors, causes the one or more processors to perform the method recited in claim 14.

31. A machine-readable storage medium storing one or more sequences of instructions which, when executed by one or more processors, causes the one or more processors to perform the method recited in claim 15.

32. A machine-readable storage medium storing one or more sequences of instructions which, when executed by one or more processors, causes the one or more processors to perform the method recited in claim 16.

* * * * *

UNITED STATES PATENT AND TRADEMARK OFFICE
CERTIFICATE OF CORRECTION

PATENT NO.         : 7,567,975 B2                                              Page 1 of 1
APPLICATION NO.    : 11/083159
DATED              : July 28, 2009
INVENTOR(S)        : Aravind Yalamanchi It is certified that error appears in the above-identified patent and that said Letters Patent is hereby corrected as shown below:

Title Page;
On face page, in field (74), in column 2, under "Attorney, Agent or Firm", line 1, delete "Hichman" and insert -- Hickman --, therefor.

On page 2, in column 1, under "U.S. Patent Documents", line 16, after "Lipkin et al." insert -- 705/8 --.

On page 2, in column 1, under "U.S. Patent Documents", line 41, after "Horvitz et al." insert -- 709/238 --.

On page 2, in column 2, under "U.S. Patent Documents", line 36, delete "www-db" and insert -- www.db --, therefor.

In column 18, line 38, in claim 2, delete "farther" and insert -- further --, therefor.

In column 18, line 48, in claim 4, delete "farther" and insert -- further --, therefor.

In column 19, line 56, in claim 16, delete "farther" and insert -- further --, therefor.

In column 20, line 23, in claim 20, after "which" insert -- , --.

In column 20, line 27, in claim 21, after "which" insert -- , --.

In column 20, line 31, in claim 22, after "which" insert -- , --.

In column 20, line 35, in claim 23, after "which" insert -- , --.

In column 20, line 39, in claim 24, after "which" insert -- , --.

In column 20, line 43, in claim 25, after "which" insert -- , --.

Signed and Sealed this

Thirteenth Day of July, 2010

David J. Kappos
*Director of the United States Patent and Trademark Office*